United States Patent
Onuki

(10) Patent No.: US 9,727,130 B2
(45) Date of Patent: Aug. 8, 2017

(54) VIDEO ANALYSIS DEVICE, VIDEO ANALYSIS METHOD, AND POINT-OF-GAZE DISPLAY SYSTEM

(71) Applicant: Sony Computer Entertainment Inc., Tokyo (JP)

(72) Inventor: Yoshikazu Onuki, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/400,979

(22) PCT Filed: Apr. 11, 2013

(86) PCT No.: PCT/JP2013/002483
§ 371 (c)(1),
(2) Date: Nov. 13, 2014

(87) PCT Pub. No.: WO2013/175701
PCT Pub. Date: Nov. 28, 2013

(65) Prior Publication Data
US 2015/0130714 A1    May 14, 2015

(30) Foreign Application Priority Data

May 25, 2012  (JP) ................................. 2012-120124

(51) Int. Cl.
*G09G 5/00* (2006.01)
*G06F 3/01* (2006.01)
(Continued)

(52) U.S. Cl.
CPC ............ *G06F 3/011* (2013.01); *G06F 1/3209* (2013.01); *G06F 3/012* (2013.01); *G06F 3/013* (2013.01);
(Continued)

(58) Field of Classification Search
CPC ............. G06F 3/01; G06F 3/012; G06F 3/013
(Continued)

(56) References Cited

U.S. PATENT DOCUMENTS 4,034,401 A  *  7/1977  Mann ...................... F41G 3/225
                                            33/262
4,852,988 A  *  8/1989  Velez ...................... A61B 3/113
                                            351/158
(Continued)

FOREIGN PATENT DOCUMENTS

CN       101872237 A       10/2010
CN       101901485 A       12/2010
(Continued)

OTHER PUBLICATIONS

White et al. (hereinafter "White," "Spatially Dynamic Calibration of an Eye-Tracking System," IEEE Transactions on Systems, Man, and Cybernetics, vol. 23, No. 4, Jul./Aug. 1993).*
(Continued)

*Primary Examiner* — Jason Mandeville
(74) *Attorney, Agent, or Firm* — Matthew B. Dernier, Esq.

(57) ABSTRACT

A video acquirer acquires video obtained by imaging, by an imaging element that moves in association with motion of a head of a user, an area including reflected light of each of light beams irradiated to either one eyeball of the user from two light sources of a first light source that moves in association with the motion of the head of the user and a second light source whose relative position is invariable with respect to a video presenter as an observation target for the user. A head movement estimator estimates the motion of the head of the user based on a relative position of the
(Continued)

reflected light of the second light source with respect to the reflected light of the first light source in the video acquired by the video acquirer.

6 Claims, 13 Drawing Sheets

(51) Int. Cl.
*G06F 1/32* (2006.01)
*G06K 9/00* (2006.01)
*G06T 7/246* (2017.01)

(52) U.S. Cl.
CPC .......... *G06K 9/00597* (2013.01); *G06T 7/246* (2017.01); *A63F 2300/1087* (2013.01); *A63F 2300/6045* (2013.01); *G06T 2207/10016* (2013.01); *G06T 2207/10048* (2013.01); *G06T 2207/30241* (2013.01)

(58) Field of Classification Search
USPC .................................................. 345/156–158
See application file for complete search history.

(56) References Cited

U.S. PATENT DOCUMENTS

| | | | | |
|---|---|---|---|---|
| 5,016,282 | A * | 5/1991 | Tomono | G06F 3/013 382/117 |
| 5,604,818 | A * | 2/1997 | Saitou | G06T 7/70 348/78 |
| 5,668,622 | A * | 9/1997 | Charbonnier | G06F 3/013 351/158 |
| 7,538,744 | B1 * | 5/2009 | Liu | G06F 3/013 345/7 |
| 8,077,914 | B1 * | 12/2011 | Kaplan | A61B 3/113 351/209 |
| 8,929,589 | B2 * | 1/2015 | Publicover | G06K 9/00604 382/103 |
| 8,942,419 | B1 * | 1/2015 | Wu | G01S 17/06 382/103 |
| 9,185,196 | B2 * | 11/2015 | Guitteaud | F16M 13/00 |
| 2006/0110008 | A1 | 5/2006 | Vertegaal | |
| 2011/0085139 | A1 * | 4/2011 | Blixt | A61B 3/113 351/209 |
| 2011/0182472 | A1 * | 7/2011 | Hansen | A61B 3/113 382/103 |

FOREIGN PATENT DOCUMENTS

| | | | |
|---|---|---|---|
| JP | 4-288122 A | 10/1992 | |
| JP | 7229714 A | 8/1995 | |
| JP | 9179062 A | 7/1997 | |
| JP | 2000316811 A | 11/2000 | |
| JP | 2002143094 A | * 5/2002 | |

OTHER PUBLICATIONS

International Preliminary Report on Patentability and Written Opinion for corresponding application PCT/JP2013/002483, dated Dec. 4, 2014.

International Search Report for corresponding application PCT/JP 2013/002483, dated Jun. 18, 2013.

Onuki et al. 'Analysis of Aiming Performance for Games Using Mapping Method of Corneal Reflections Based on Two Different Light Sources', World Academy of Science, Engineering and Technology, Issue 0065 p. 1100-1106, (May 2012).

Office Action for corresponding CN Patent Application 201380025947.1, 3 pages, dated Nov. 3, 2015.

* cited by examiner

F I G . 1
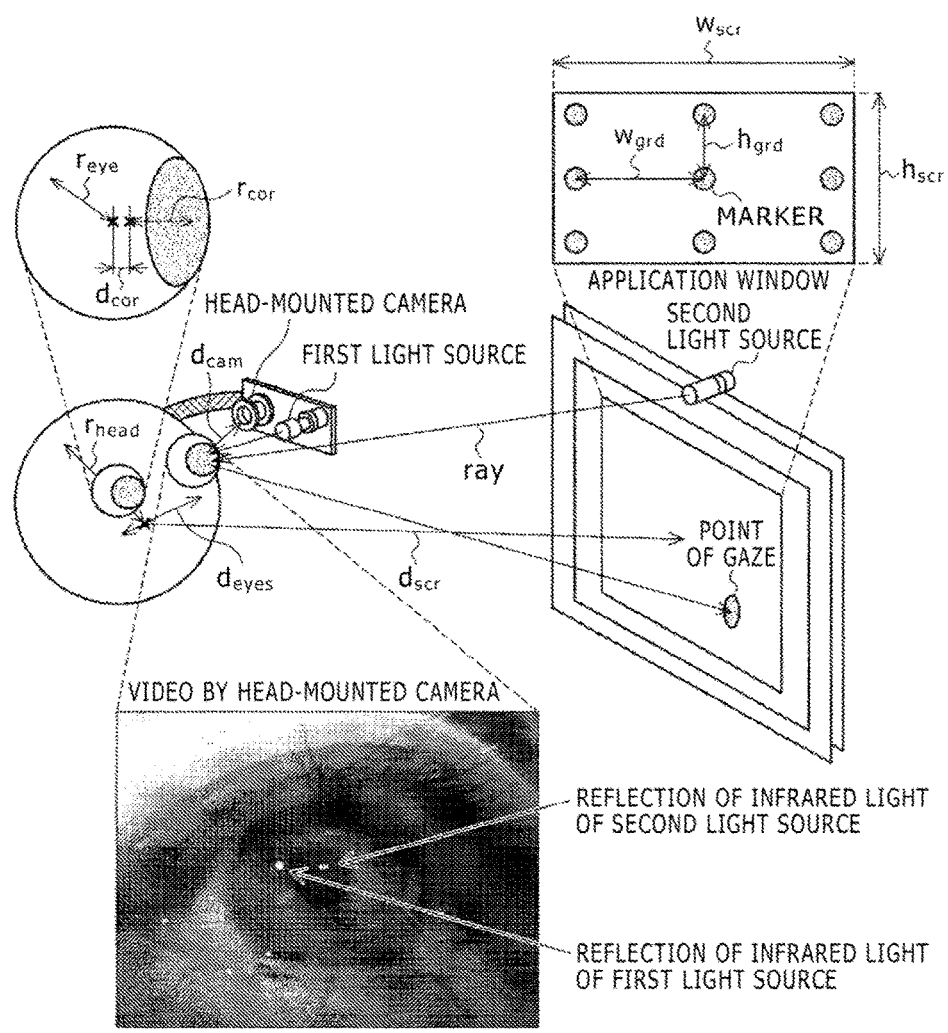

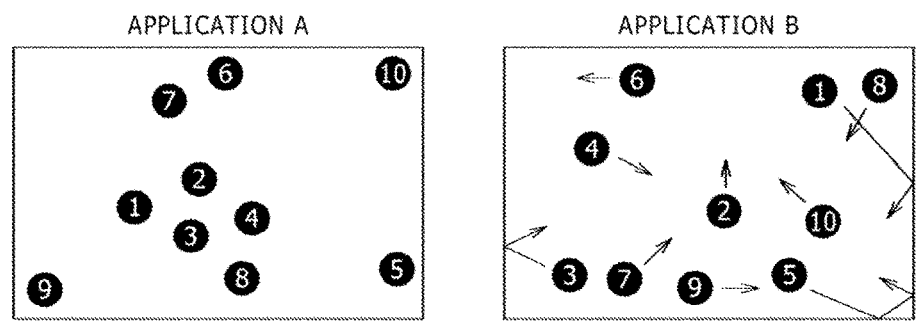
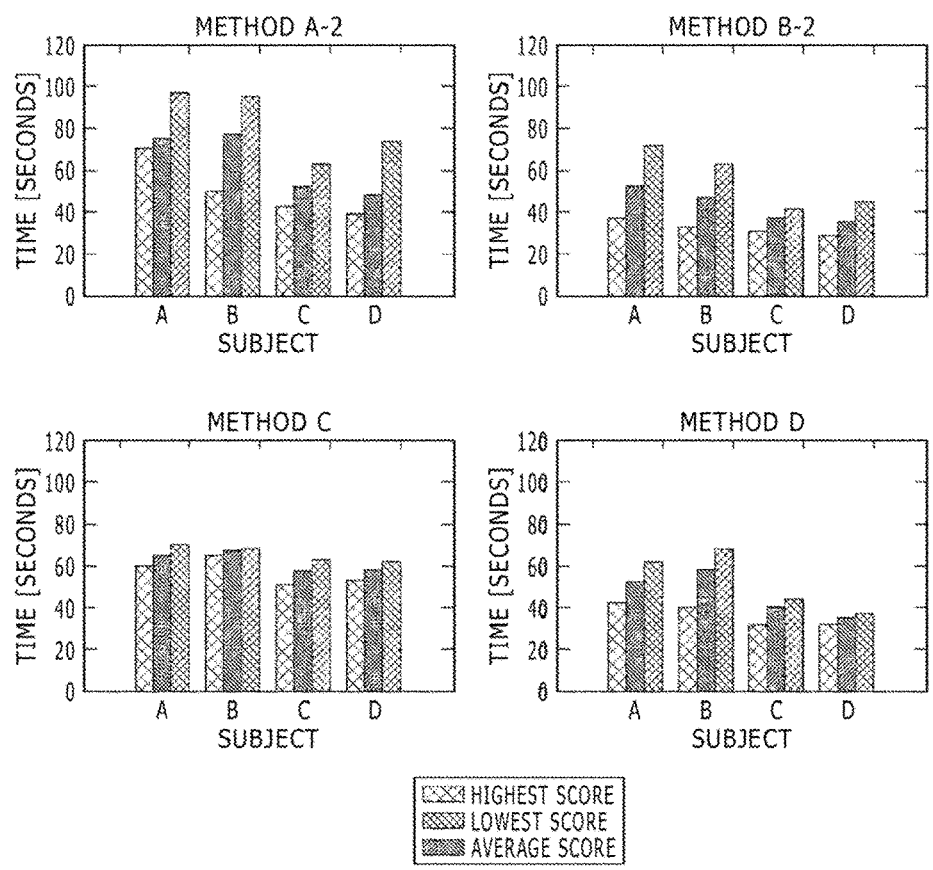

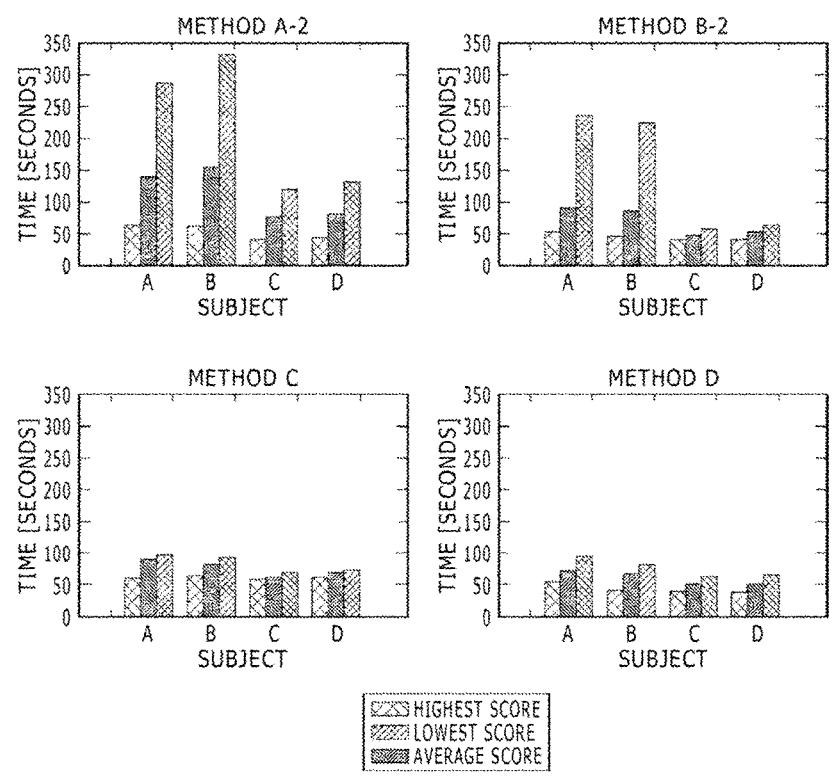

FIG. 13
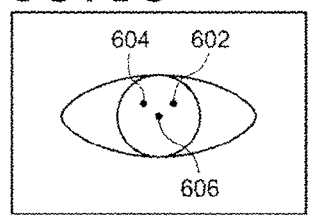
(a)
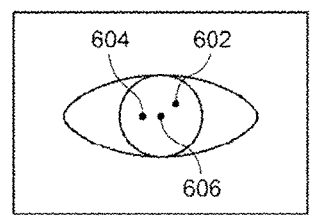
(b)
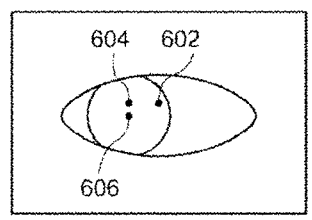
(c)
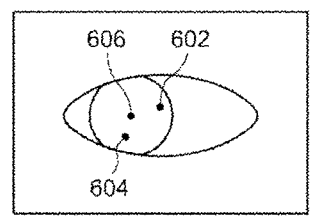
(d)

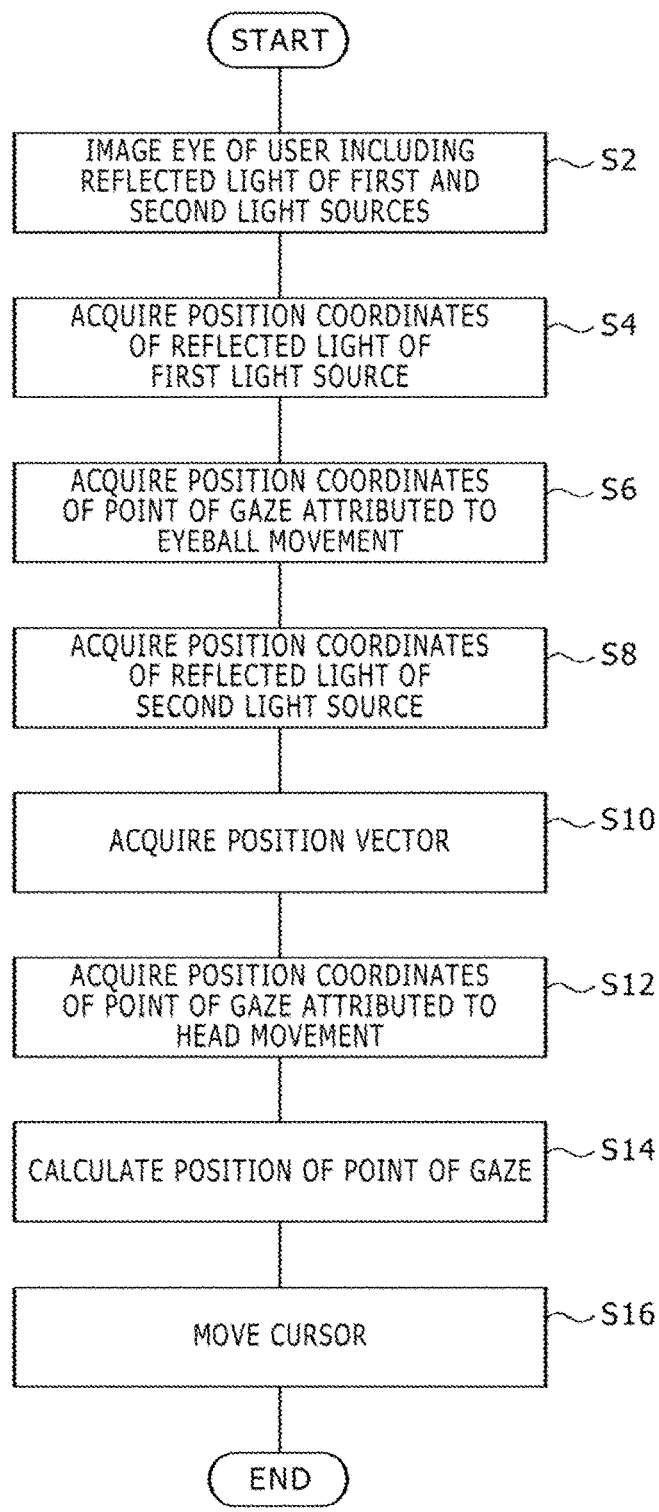

VIDEO ANALYSIS DEVICE, VIDEO ANALYSIS METHOD, AND POINT-OF-GAZE DISPLAY SYSTEM

TECHNICAL FIELD

The present invention relates to a video analysis device, a video analysis method, and a point-of-gaze display system.

BACKGROUND ART

Estimation techniques of a point of gaze (Point-Of-Gage; POG) have been studied long and are applied to many fields relating to dialogue with a computer, such as information input to a computer and observation of a target of attention of a person on a web browser. To achieve high-accuracy point-of-gaze estimation, accurate measurement of a center of curvature of a cornea and a center of a pupil is carried out in consideration of optical refraction in some cases.

On the other hand, in a case of applying the point-of-gaze estimation technique to an application like e.g. a game, it is required that point-of-gaze control can be easily carried out through comfortable operation rather than that always a point of gaze is accurately estimated. In other words, a technique by which a cursor can be accurately aligned on a target with a line of sight put on the target is desired.

SUMMARY

Technical Problem

The above-described point-of-gaze estimation technique, in which the center of curvature of a cornea and the center of a pupil are measured in consideration of optical refraction, has high accuracy. However, comparatively high calculation capability is necessary and therefore delay is possibly caused.

The present invention is made in view of such a problem and an object thereof is to provide a technique that enables control of the point of gaze without taking calculation cost.

Solution to Problem

To solve the above-described problem, a certain aspect of the present invention is a video analysis device. This device includes a video acquirer that acquires video obtained by imaging, by an imaging element that moves in association with motion of a head of a user, an area having reflected light of each of light beams irradiated to either one eyeball of the user from two light sources of a first light source that moves in association with the motion of the head of the user and a second light source whose relative position is invariable with respect to a video presenter as an observation target for the user, and a head movement estimator that estimates the motion of the head of the user based on a relative position of the reflected light of the second light source with respect to the reflected light of the first light source in the video acquired by the video acquirer.

Another aspect of the present invention is a video analysis method. This method causes a processor to execute acquiring video obtained by imaging, by an imaging element that moves in association with motion of a head of a user, an area including a reflected light beam of each of light beams irradiated to either one eyeball of the user from two light sources of a first light source that moves in association with the motion of the head of the user and a second light source whose relative position is invariable with respect to a video presenter as an observation target for the user, and estimating the motion of the head of the user based on the relative position of the two reflected light beams in the video.

Further another aspect of the present invention is a point-of-gaze display system. This system includes a head-mounted imaging element that is an imaging element to image either one eyeball of a user and moves in association with motion of a head of the user, a first light source that is a light source to irradiate the eyeball imaged by the imaging element with light and moves in association with motion of the imaging element, a video presenter as an observation target for the user, and a second light source that is a light source to irradiate the eyeball imaged by the imaging element with light and is attached to the video presenter. This system further includes a head movement estimator that estimates the motion of the head of the user based on a relative position of reflected light of the second light source with respect to reflected light of the first light source in video obtained by imaging by the imaging element, an eyeball movement estimator that estimates motion of the eyeball imaged by the imaging element based on the absolute position of the reflected light of the first light source in the video obtained by imaging by the imaging element, a gaze position acquirer that acquires a gaze position of the user based on the motion of the head of the user and the motion of the eyeball that are estimated, and a cursor generator that generates a cursor image displayed at a position in a display area of the video presenter corresponding to the gaze position acquired by the gaze position acquirer.

Further another aspect of the present invention is a program that causes a computer to implement the respective steps of the above-described method.

This program may be provided as part of firmware embedded in apparatus for carrying out basic control of hardware resources such as video and audio decoders. This firmware is stored in e.g. a ROM (Read Only Memory) in apparatus or a semiconductor memory such as a flash memory. To provide this firmware or update part of the firmware, a computer-readable recording medium in which this program is recorded may be provided or this program may be transmitted by a communication line.

What are obtained by translating arbitrary combinations of the above constituent elements and expressions of the present invention among method, device, system, computer program, data structure, recording medium, and so forth are also effective as aspects of the present invention.

Advantageous Effect of Invention

According to the present invention, a technique that enables control of the point of gaze without taking calculation cost can be provided.

BRIEF DESCRIPTION OF DRAWINGS

FIG. 1 is a systematic diagram of a line-of-sight tracking system using corneal reflection according to an embodiment.

FIG. 8 is a diagram showing applications for evaluating a performance of the respective methods according to the embodiment in cases of game use.

FIG. 9 is a diagram showing results of the evaluation of the performance of the respective methods according to the embodiment in cases of game use.

FIG. 10 is another diagram showing the results of the evaluation of the performance of the respective methods according to the embodiment in cases of game use.

FIGS. 13(*a*) to (*d*) are diagrams to exemplify a positional relationship between the position $P_{cor\_hm}$ of reflected light of a first light source 220 and the position $P_{cor\_scr}$ of reflected light of a second light source 400.

FIG. 14 is a flowchart showing a flow of processing in the point-of-gaze display system according to the embodiment.

DESCRIPTION OF EMBODIMENTS

Figure 2:
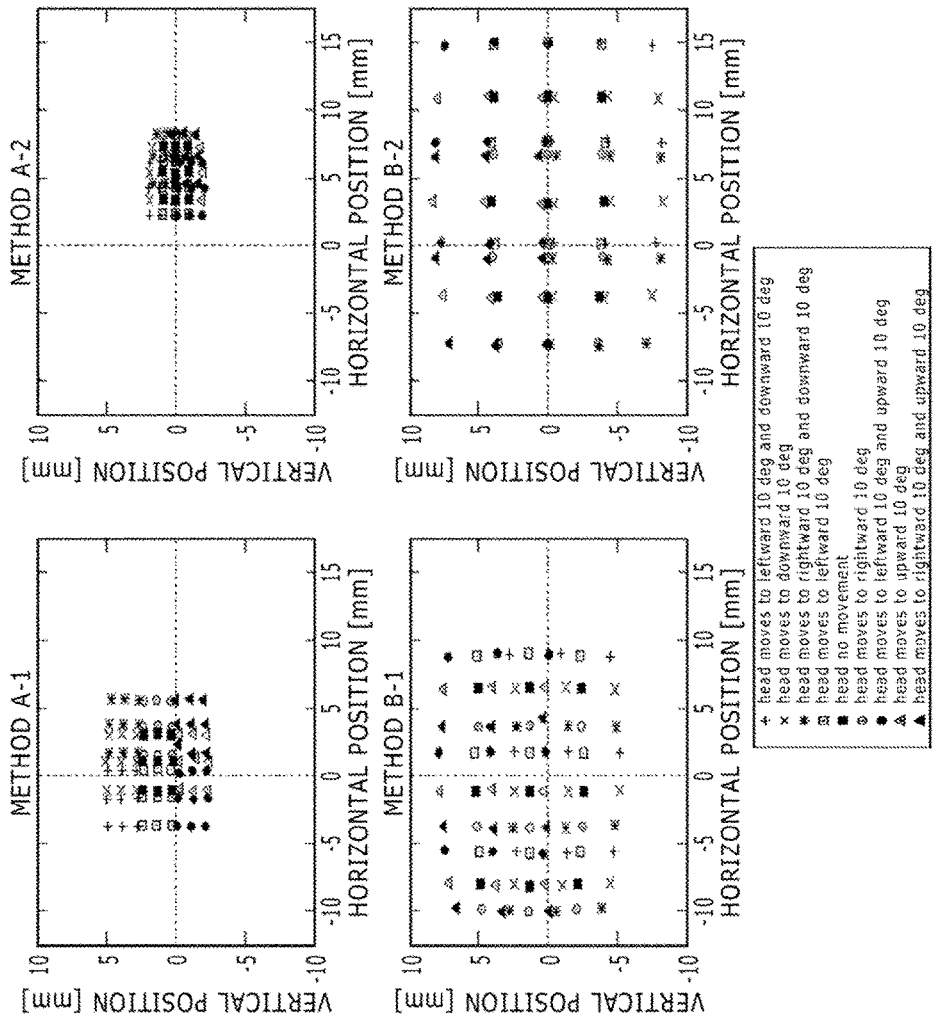
FIG. 2 is a diagram showing coordinates of $P_{cor}$ corresponding to respective $P_{gaze}$ on a screen in methods A-1 and A-2 according to the embodiment.

The present invention will be explained below based on a preferred embodiment. First, theory as a basis of the embodiment will be described as a premise technique and then a specific embodiment will be explained.

(Premise Technique)

I. Preface

Estimation techniques of a point of gaze have been studied long and are applied to many fields relating to dialogue with a computer, such as information input to a computer and observation of a target of attention of a person on a web browser. In almost all situations, one of the most significant concerns is high-accuracy point-of-gaze estimation. To achieve this purpose, accurate measurement of a center of curvature of a cornea and a center of a pupil is carried out in consideration of optical refraction in some cases. Although this method has very high accuracy, comparatively high calculation capability is necessary and therefore delay is caused. In a game, minimizing a delay of input data is one of the most important requisites. Therefore, such complicated image processing should be avoided as much as possible.

On the other hand, when effective use of line-of-sight estimation in a game is considered, the first thing thought of is application to a first person shooter (FPS). If completely accurate line-of-sight estimation can be realized, it can be immediately applied thereto. However, in actual, the estimated point of gaze tends to easily deviate from the actual point of gaze due to many factors. In such a condition, importance in aligning sights on a target is that point-of-gaze control can be easily carried out through comfortable operation rather than that always a point of gaze is accurately estimated. In other words, capability by which a cursor can be accurately aligned on the target with a line of sight put on the target is very important. Incidentally, from a viewpoint of game creation, a feeling of being present in a real world can be well expressed in some cases if a motion of the head and a motion of the line of sight can be separately expressed. A case in which a background image is panned in association with the motion of the head and a cursor is moved by the motion of the line of sight is a typical example thereof.

II. Related Methods

In the point-of-gaze estimation, it is general to utilize light source reflection on a corneal surface. FIG. 1 is a systematic diagram of a line-of-sight tracking system using corneal reflection. In this diagram, two infrared light sources are shown. One exists over a screen and the other is mounted on a head. In many studies, either one of them is used for the point-of-gaze estimation. As seen in an image in FIG. 1, a light intensity of the light source over the screen is comparatively high (configuration in which three light sources are lined on two columns) and a light source with very low output power is placed immediately close to a tip of a nose. The reason for selection of the former is effective discrimination of reflection of two kinds of light sources and the reason for selection of the latter is because adverse effects on the eye are taken into account. Furthermore, a camera is mounted on the head in order to obtain an image of the eye with a higher resolution. The configuration is so made that infrared reflection can be efficiently detected by using a standard USB 2.0 camera and removing an infrared blocking sheet.

By using this system, mapping transformation from coordinates of a corneal reflection point $P_{cor}$ to a point $P_{gaze}$ of gaze can be represented by the following expression (1).

$$P_{gaze} = M \cdot P_{cor} \quad (1)$$

In expression (1), M is a mapping transformation matrix. In a standard case, M is calculated by a calibration process. In this process, a subject gazes at several specific fixed points on the screen (normally four corners and center) and the coordinates of corneal reflection points in association with it are each measured. Based on this relationship represented by expression (1), an influence of the motion of the head in the line-of-sight estimation is simulated by using two simple line-of-sight estimation techniques shown below. In this simulation, a subject gazes at nine markers that are spread across the whole screen and arranged in a grid manner as shown in FIG. 1. Furthermore, the subject rotates the head leftward, rightward, upward, and downward by 10 degrees in each rotational direction. Parameters used in this simulation are shown in Table 1.

TABLE 1

Parameters of Simulation

| Symbol | Meaning | Value |
|---|---|---|
| $r_{head}$ | radius of head | 10.0 cm |
| $r_{eye}$ | radius of eyeball | 2.4 cm |
| $r_{cor}$ | radius of curvature of cornea | 1.8 cm |
| $d_{cor}$ | distance between center of eyeball and center of curvature of cornea | 0.8 cm |
| $d_{eye}$ | distance between centers of both eyes | 7.0 cm |
| $d_{cam}$ | distance between camera and center of eyeball | 5.0 cm |
| $d_{scr}$ | distance between center of head and center of screen | 50.0 cm |
| $w_{scr}$ | width of screen | 32.0 cm |
| $h_{scr}$ | height of screen | 16.0 cm |
| $w_{grd}$ | interval of markers in horizontal direction (width of grid) | 16.0 cm |
| $h_{grd}$ | interval of markers in vertical direction (height of grid) | 8.0 cm |

A. Simple Mapping Method in which Point of Gaze is Estimated by Using Corneal Reflection of Single Light Source (Method A)

One of the simplest methods in line-of-sight estimation is mapping $P_{cor}$ onto $P_{gaze}$. However, it is well known that the motion of the head sensitively affects the mapping in this method.

In FIG. 2, the coordinates of $P_{cor}$ corresponding to the respective $P_{gaze}$ on the screen in methods A-1 and A-2 are shown. Here, method A-1 is a case in which $P_{cor}$ of the light source set over the screen is used and it is represented by $P_{cor\_scr}$. Here, the mapping transformation can be represented by the following expression (2).

$$P_{gaze}=M_{scr} \cdot P_{cor\_scr} \qquad (2)$$

In expression (2), $M_{scr}$ represents a mapping transformation matrix that has been subjected to calibration and $P_{gaze}$ represents the estimated point of gaze. Method A-2 is a case in which $P_{cor}$ of the light source mounted on the head is used and it is represented by $P_{cor\_hm}$. Here, the mapping transformation can be represented by the following expression (3).

$$P_{gaze}=M_{hm} \cdot P_{cor\_hm} \qquad (3)$$

In expression (3), $M_{hm}$ represents a mapping transformation matrix that has been subjected to calibration.

A fact shown by these results is that the point of gaze greatly changes according to the motion of the head and thus the subject must firmly fix the head and move only the eye for accurate estimation of the point of gaze. Moreover, in method A-2, the influence of the motion of the head is smaller than in method A-1. However, a distortion of the point rows worsens particularly when the subject moves the head rightward. This is attributed to a relationship between the position of the camera and the position of the light source mounted on the head. Although the situation is improved through position adjustment, the tendency does not greatly change.

B. Mapping Method in which Point of Gaze is Estimated by Using Relative Position of Corneal Reflection and Center of Pupil (Method B)

It is known that detection of a relative position of $P_{cor}$ and the center of the pupil and mapping onto $P_{gaze}$ are comparatively less susceptible to the motion of the head. In FIG. 2, the coordinates of the relative position of $P_{cor}$ and the center of the pupil corresponding to the respective $P_{gaze}$ on the screen in methods B-1 and B-2 are shown. Here, method B-1 shows a case in which $P_{cor}$ of the light source over the screen is used. Here, the mapping transformation can be represented by the following expression (4).

$$P_{gaze}=M_{scr\_pup} \cdot (P_{cor\_scr}-C_{pup}) \qquad (4)$$

In expression (4), $M_{scr\_pup}$ represents a mapping transformation matrix that has been subjected to calibration and $C_{pup}$ represents the coordinates of the center of the pupil. Method B-2 shows a case in which $P_{cor}$ of the light source mounted on the head is used. Here, the mapping transformation can be represented by the following expression (5).

$$P_{gaze}=M_{hm\_pup} \cdot (P_{cor\_hm}-C_{pup}) \qquad (5)$$

In expression (5), $M_{hm\_pup}$ is a mapping transformation matrix that has been subjected to calibration. A fact shown by these results is that the influence of the motion of the head is smaller than in methods A-1 and A-2 and therefore the estimated point of gaze does not greatly change even when the subject moves the head. Furthermore, a dynamic range of detected $P_{cor\_hm}-C_{pup}$ is wider than in methods A-1 and A-2. That is, $P_{gaze}$ of a higher resolution can be obtained by using methods B-1 and B-2. On the other hand, although direct observation from these results is impossible, a calculation for detecting $C_{pup}$ is more complicated. Particularly when the pupil is uncertain at the center of the eye, high accuracy is not ensured because of pupil recognition with low reliability and an influence of optical refraction. Moreover, it is known that the influence of the motion of the head is not greatly improved when the camera exists at a position far from the subject. Although not described in the present specification, according to another simulation, the influence of the motion of the head becomes so small as to be ignorable when the camera is put over the screen. However, in the present analysis, priority is given to a high-resolution camera image over such high performance. This is because using a long-distance camera requires advanced techniques for detection and recognition and possibly lowers the estimation performance.

III. PROPOSED TECHNIQUE

A proposed technique utilizes a characteristic that a relative position between $P_{cor\_scr}$ and $P_{cor\_hm}$ reflects the motion of the head. Furthermore, by combining it with method A, a novel line-of-sight estimation technique under a situation in which the head moves is presented. An important point is that detection of the center of a pupil is unnecessary in all procedures. This can suppress the necessary calculation capability to comparatively low capability.

A. Mapping Method in which Motion of Head is Estimated by Using Positional Relationship of Corneal Reflection of Two Light Sources (Method C)

Figure 3:
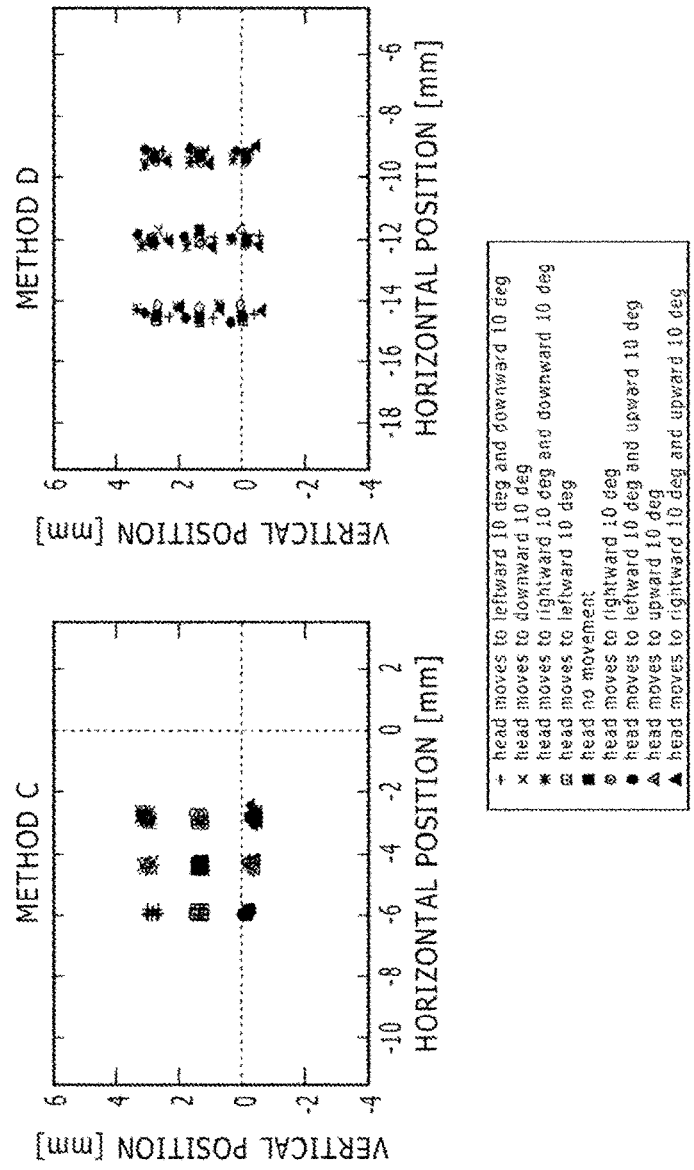
FIG. 3 is a diagram showing coordinates of relative position of $P_{cor\_scr}$ and $P_{cor\_hm}$ in method C according to the embodiment.

FIG. 3 shows the coordinates of the relative position of $P_{cor\_scr}$ and $P_{cor\_hm}$ in method C. Here, the mapping transformation can be represented by the following expression (6).

$$P_{gaze}=M_{scr\_hm} \cdot (P_{cor\_scr}-P_{cor\_hm}) \qquad (6)$$

In expression (6), $M_{cor\_hm}$ represents a mapping transformation matrix that has been subjected to calibration. A fact shown by these results is that $P_{cor\_scr}-P_{cor\_hm}$ purely reflects the motion of the head and an influence of the motion of the line of sight is almost eliminated. According to the simulation and experimental results, a relationship between the position of the head-mounted camera and the position of the head-mounted light source slightly affects the result and therefore some adjustments to the placement of them are required.

B. Mapping Method in which Point of Gaze is Estimated by Using Positional Relationship of Corneal Reflection of Two Light Sources (Method D)

Method A is the simplest technique for estimating the point of gaze. However, the influence of the motion of the head is significantly large. On the other hand, method C purely reflects the motion of the head and the influence of the motion of the line of sight is almost eliminated. The proposed technique is based on an idea that the influence of the motion of the head in method A is eliminated by using method C. When method A-2 is used, method D is represented by the following expression (7).

$$P_{gaze}=M_{hm} \cdot P_{cor\_hm}+M_{scr\_hm} \cdot (P_{cor\_scr}-P_{cor\_hm}) \qquad (7)$$

In the case of $M_{hm} \cdot P_{cor\_hm}=0$, expression (7) is equal to expression (6). That is, in calibration of $M_{scr\_hm}$, expression (6) holds if $M_{hm} \cdot P_{cor\_hm}=0$. Actually, the realization thereof is not difficult if the calibration is executed in accordance with following processes 1 to 4.

1. $M_{hm}$ is estimated by measuring $P_{cor\_hm}$ and calculating a matrix for transformation from $P_{cor\_hm}$ to $P_{gaze}$. At this time, the subject firmly fixes the head and tracks a "marker for calibration."

2. "Marker 1" representing $P_{gaze}$ ($=M_{hm} \cdot P_{cor\_hm}$) is displayed on the screen by using the result of this first calibration.

3. "Marker 2" is displayed at the center of the screen (=0).

4. $M_{scr\_hm}$ is estimated by measuring $P_{cor\_scr} - P_{cor\_hm}$ and calculating a matrix for transformation from $P_{cor\_scr} - P_{cor\_hm}$ to $P_{gaze}$. In tracking of the "marker for calibration," the subject gazes at the marker in such a manner that "marker 1" overlaps with "marker 2."

Alternatively, there is also a method in which $P_{cor\_hm}$ and $P_{cor\_scr}$ are measured when the subject moves the head while gazing at the center of the screen. By calculating the relationship between these two elements, $M_{hm}^{-1} \cdot M_{scr\_hm}$ can be obtained. Actually, in method D in FIG. 3, $P_{gaze}$ is obtained by performing simulation of $P_{cor\_hm} + M_{hm}^{-1} \cdot M_{scr\_hm} \cdot (P_{cor\_scr} - P_{cor\_hm})$ on condition that the mapping transformation is simple linear transformation. That is, the influence of the motion of the head in method A-2 can be eliminated by using the result of method C and $P_{gaze}$ can be accurately estimated.

IV. Experiment

A. Experimental System

Figure 4:
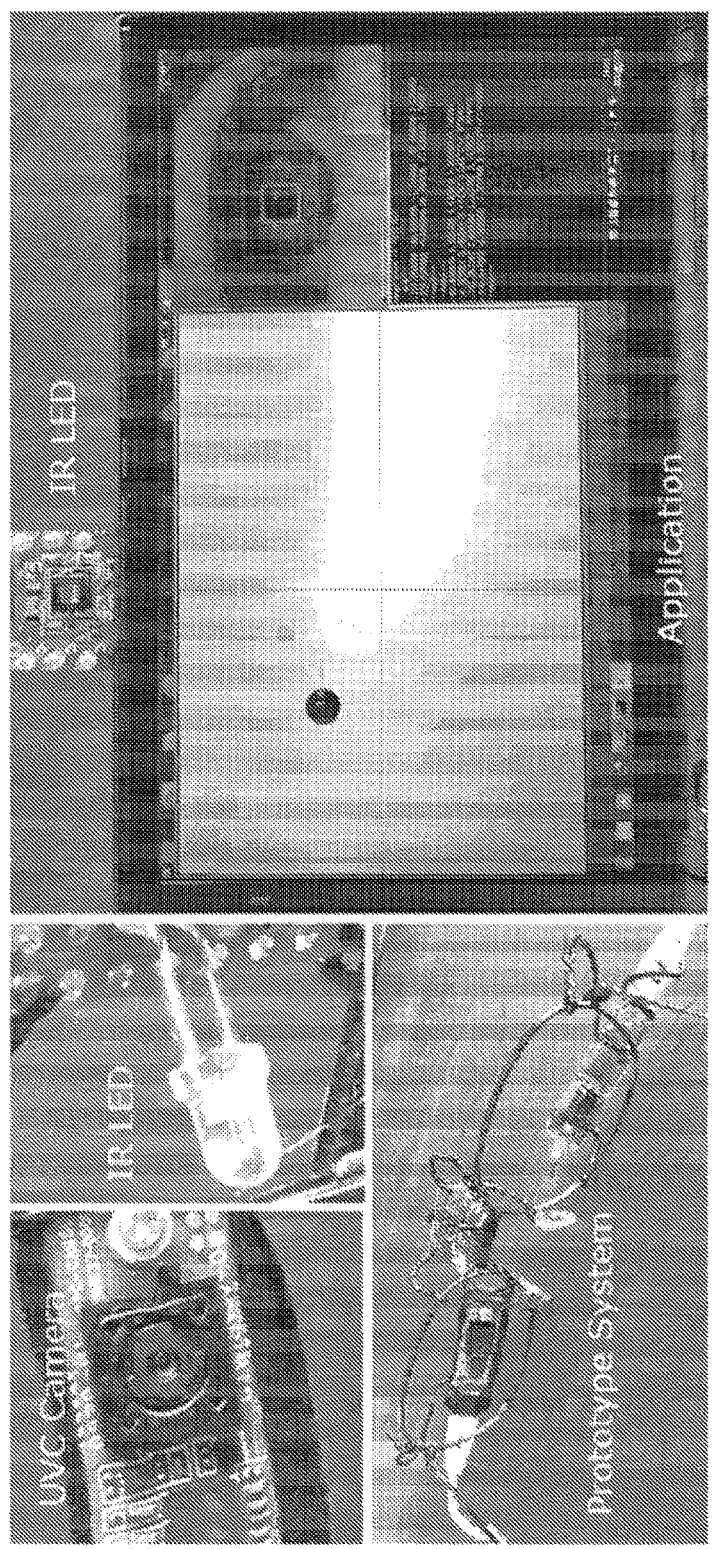
FIG. 4 is a diagram showing an experimental system for comparing a performance of respective methods according to the embodiment.

FIG. 4 shows an experimental system for comparing the performance of the above-described respective methods. The example shown in FIG. 4 is an initial prototype and therefore looks like a handmade system in appearance. However, it sufficiently operates. In the example shown in FIG. 4, two cameras are put in front of the left and right respective eyes and only one of them is used in evaluation. A size of an image photographed by the camera is VGA (Video Graphics Array) and a photographing speed is about 10 fps.

B. Calibration

Figure 5:
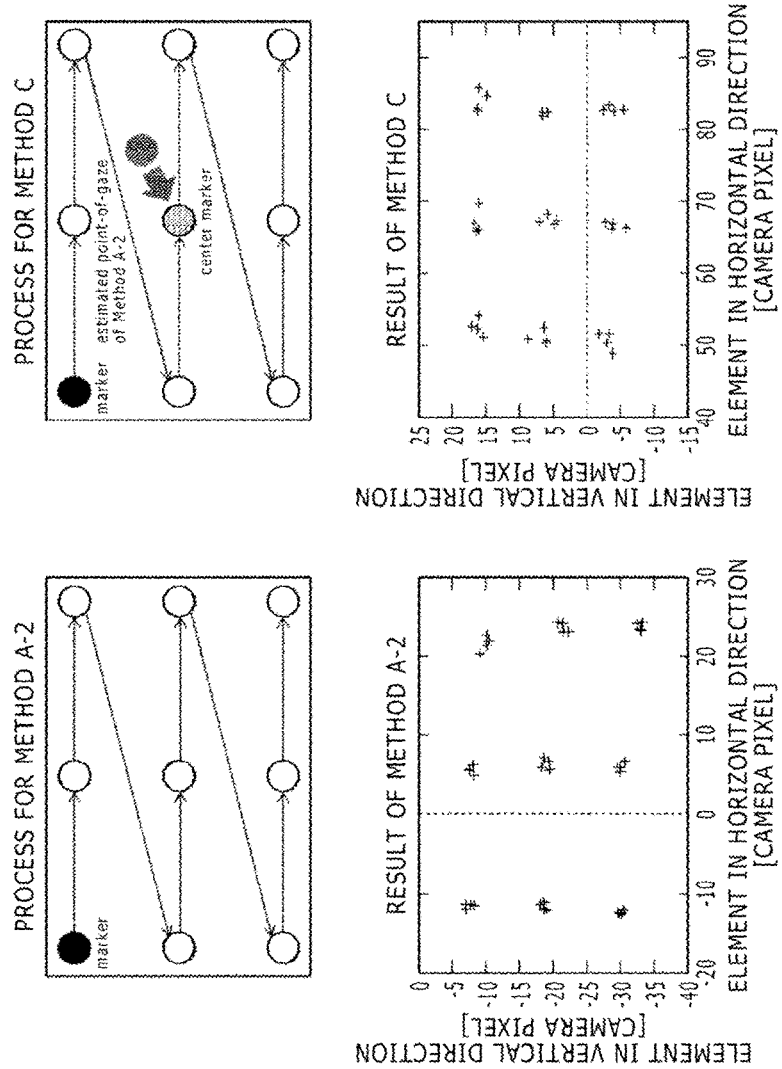
FIG. 5 is a diagram showing calibration process and calibration result of each phase according to the embodiment.

The calibration process is composed of two phases. The first phase is for method A-2 and the second phase is for method C. FIG. 5 shows the calibration process and the calibration result of each phase. In the calibration process of method A-2, the subject successively gazes at nine markers as shown in "process for method A-2" in FIG. 5. In this procedure, it is an important point for the subject to move only the line of sight without moving the head. An example of the result of measured $P_{cor\_hm}$ is shown in "result of method A-2" in FIG. 5. In this diagram, a unit of each axis is a pixel of the camera under a condition in which a photographed full-scale camera image is 640*480 pixels. After this step, the calibration process for method C is started. The motion of the marker is the same as that in the previous order and a center marker and the estimated point of gaze by method A-2 are further shown throughout the whole procedure. The subject gazes at nine markers one by one and moves the head so that the markers of the estimated point of gaze may each overlap with the center marker. An example of the result of measured $P_{cor\_scr} - P_{cor\_hm}$ is shown in "result of method C" in FIG. 5. This result shows that the motion of the head can be measured comparatively accurately. Moreover, because $M_{hm} \cdot P_{cor\_hm} = 0$ is kept throughout the whole calibration process for method C, method D can be realized by a linear combination of method A-2 and method C as shown by expression (7).

C. Comparison of Point-of-Gaze Estimation

Figure 6:
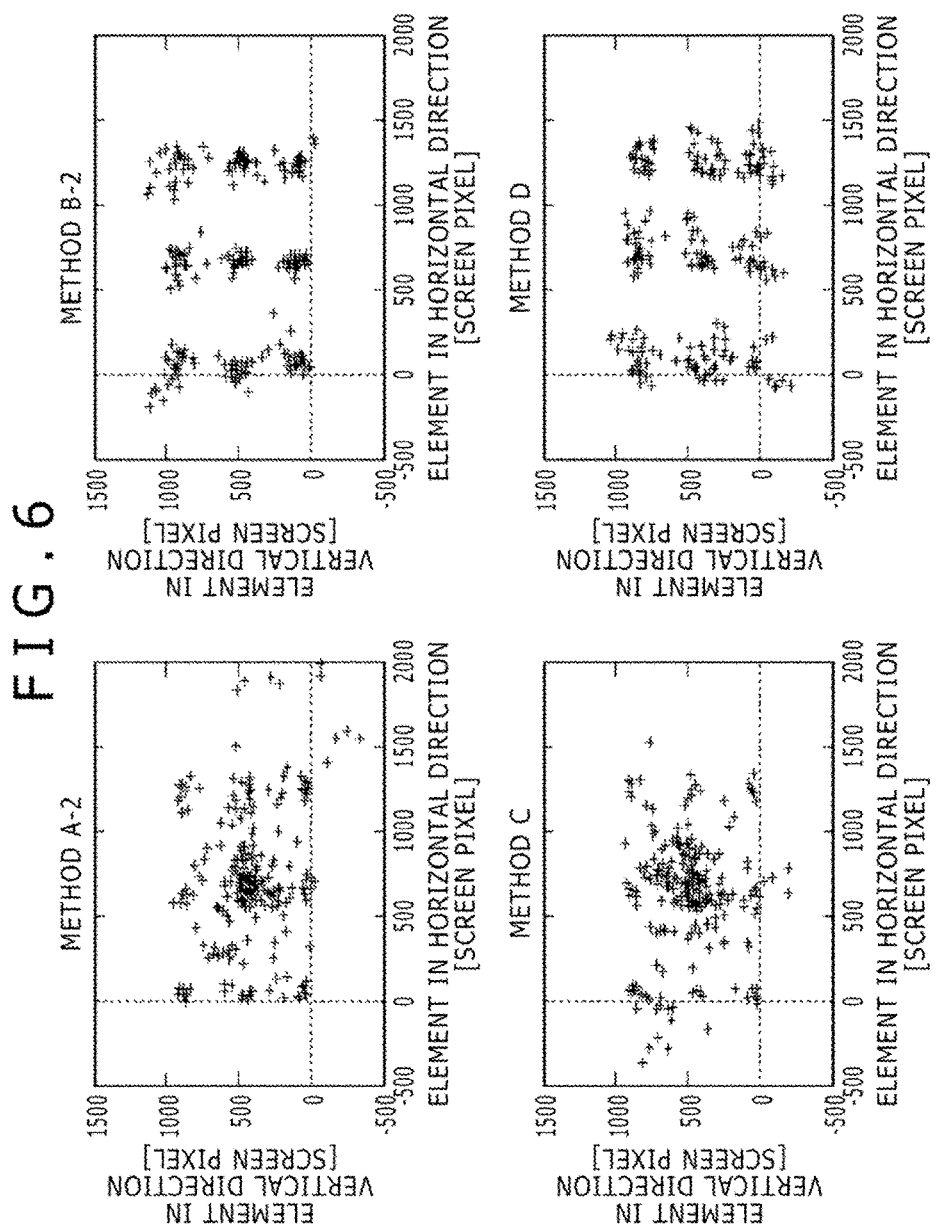
FIG. 6 is a diagram showing estimated points of gaze when a subject tracks nine markers on the screen.

The evaluation presented here does not focus on the accuracy of the point-of-gaze estimation but places emphasis on capability of easy accession to a target. Therefore, an algorithm according to the present embodiment is not so adjusted as to carry out an accurate line-of-sight estimation method. The mapping algorithm is simple linear transformation and does not use an advanced filter except a Gaussian filter in the first process. FIG. 6 shows the estimated points of gaze when a subject tracks nine markers on the screen in such a situation. In this experiment, the subject is not restricted in moving the head and thus the influence of the motion of the head is directly observed. In this diagram, a unit of each axis is the pixel of the camera under a condition in which an actual size of the panel is 1920*1080 and a window size of the experimental application is 1300*940 (equivalent to a size of width 20 cm and height 14 cm). In the result, in method B-2 and method D, the estimated points of gaze concentrate around the points of the nine markers even when the head moves.

D. Comparison as Cursor Moving Means

Figure 7:
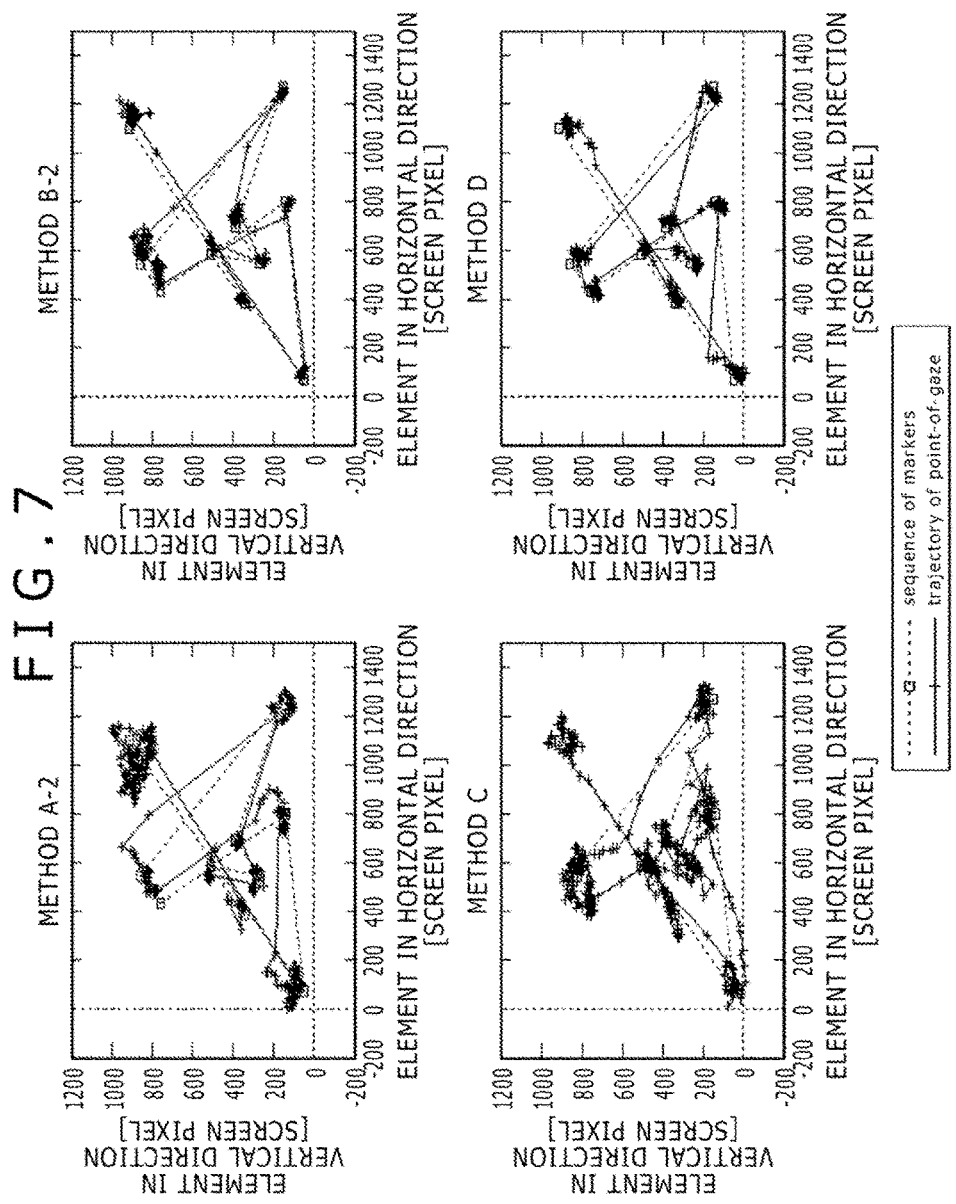
FIG. 7 is a diagram showing trajectories when a subject makes a cursor overlap with ten fixed markers one by one.

If the point-of-gaze estimation can be accurately carried out, it becomes possible to rapidly carry out cursor movement. However, capability of accession to a target is also important. FIG. 7 shows trajectories when a subject makes a cursor overlap with ten fixed markers one by one. In the case of method A-2, first the cursor rapidly moves and thereafter a step of putting the cursor based on the motion of the head is observed. Although often overshooting the marker, the cursor surely reaches the marker. Actually, in method A-2, stress imposed on the subject is not large because the influence of the motion of the head is clear. In the case of method B-2, the cursor moves very rapidly and the step of putting the cursor is unnecessary in most cases. However, when the cursor misses the marker, the subject is forced to feel the stress of being incapable of even slight movement of the cursor toward the marker. In the case of method C, the condition considerably differs. Because the cursor is controlled only by the motion of the head, the cursor approaches the marker comparatively slowly. However, it surely reaches the marker. In the case of method D, the cursor perfectly moves and is made to overlap with the marker. Actually, in method D, the subject can easily operate the cursor because the influence of the motion of the head is clear and intuitive.

E. Comparison of Performance in Game Use

To evaluate a performance of the respective methods in cases of game use, game-like applications shown in FIG. 8 are used. In application A, ten markers are successively displayed and they do not move. A subject controls a cursor representing the estimated point of gaze to make it overlap with the marker. A time until the overlapping is counted. At the elapse of two seconds, the marker disappears and another marker appears. Because plural markers are not simultaneously displayed, the subject concentrates on one marker and sequentially handles it. The marker is shown by a circle with a radius of 40 pixels (6 mm) and the cursor representing the estimated point of gaze is shown by a circle with a radius of 20 pixels (3 mm). When ends of these circles get contact with each other, i.e. a distance between the centers of them becomes shorter than 60 pixels (9 mm), the circles are recognized to have overlapped with each other. In application B, an appearance condition of markers is the same as that in application A. Furthermore, the markers move at a speed of about 200 pixels per second (30 mm/second). The positions and directions of the markers are randomly decided and FIG. 8 shows one example thereof. A time until all of ten markers disappear is measured and evaluated.

Four subjects, 24-year-old woman, 35-year-old man, 43-year-old woman, and 45-year-old man, participated in the experiment. The 43-year-old woman and the 45-year-old man were familiar with this system and the remaining two subjects used this system for the first time. All subjects executed each application five times after freely trying them for a short time. The results thereof are shown in FIGS. 9 and 10. Because it takes at least two seconds until the disappearance of the marker as described, it takes at least 20 seconds per one trial.

From the result of application A, it turns out that the results of all methods are shorter than 100 seconds and thus are not particularly bad records. Methods with good average scores were method B-2 and method D and the method with the highest score was method B-2. The method with the smallest variation in the score was method C. However, method B-2 and method D were also not so bad. The method with the worst score was method A-2. On the other hand, in the result of application B, particularly bad stores were observed in method A-2 and method B-2. The method with the best average score was method D, followed by method B-2 by a slight margin. The method with the smallest variation in the score was method C and the method with the largest variation was method A-2.

E. Consideration

In method A-2, the subject fixes the head and moves only the eyes. Furthermore, method A has a characteristic that the cursor moves in the opposite direction to the motion of the head. Therefore, to move the cursor rightward, the subject moves the head leftward. When the cursor misses a marker, the subject moves the head in the opposite direction to the marker. However, the subject tends to be confused when tracking a moving marker.

In method B-2, the line-of-sight estimation can be accurately carried out and it is also possible to address the motion of the head. On the other hand, method B-2 has a negative characteristic that, once the cursor misses a marker, it is comparatively difficult to correct the error by using the motion of the head. This is the reason why the score is often particularly bad in method B-2. Although this is not so significant as in method A-2, method B-2 also has the characteristic that the cursor moves in the opposite direction to the motion of the head. However, the influence thereof is considerably small. Therefore, some subjects could not clearly feel the influence and bring the cursor close to the target. In such a situation, some subjects tried to avoid this difficulty by moving the line of sight slightly away from the marker.

In method C, the cursor is not affected by the motion of the line of sight and therefore the subject must control the cursor only by the motion of the head. Because it is impossible to rapidly move the cursor by intermittent eyeball movement, method C has a weakness that it takes a long time to bring the cursor close to the marker. However, all subjects could surely reach the marker by the clear motion of the head. As a result, stable scores were obtained although it took a long time to approach the cursor.

Method D has both characteristics of the influence of the motion of the head in method C and the influence of the motion of the line of sight in method A-2. When the subject gazes at a fixed point and moves the head, the cursor slowly moves in the same direction as that of the motion of the head. A level of the line-of-sight estimation is slightly lower than in method B-2. However, even when the cursor misses a marker, the subject can easily correct the error by the intuitive motion of the head. This is the reason why a particularly bad score was not observed in method D. In conclusion, it can be said that balance between intermittent eyeball movement and intuitive operation based on the motion of the head is well kept in method D.

V. Conclusion

In the above, consideration is made about application of the line-of-sight estimation to games and performance comparison between two conventional methods and two proposed methods is described by using game-like applications. Furthermore, the performance of the point-of-gaze control is presented with focus on the sure movement of a cursor to a target. As a result, in the proposed methods, performance similar to that of the conventional methods can be realized without calculating the center of a pupil and point-of-gaze control is obtained through intuitive operation free from stress without taking calculation cost.

(Specific Example)

Embodiment

Figure 11:
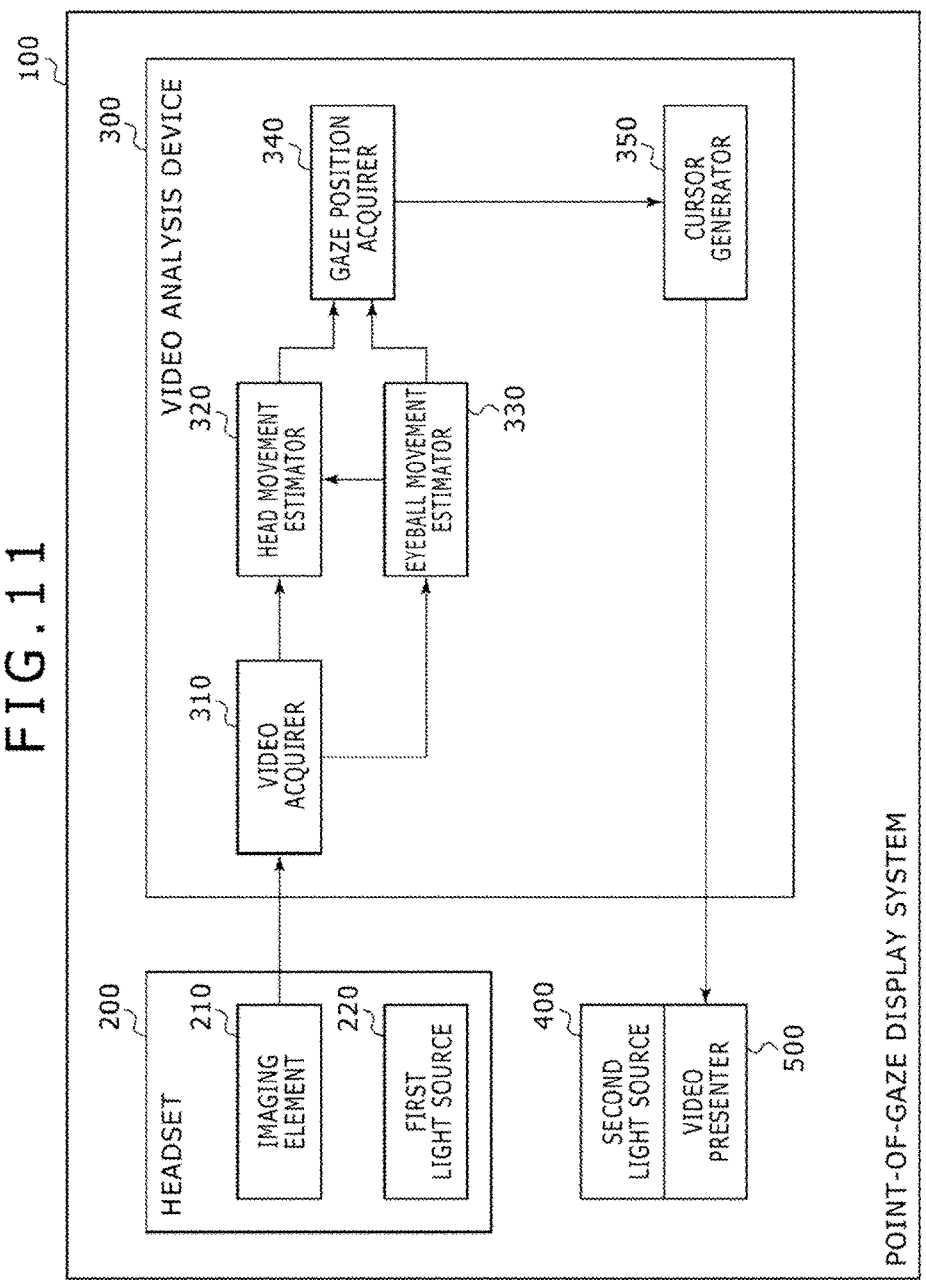
FIG. 11 is a diagram schematically showing a configuration of a point-of-gaze display system according to the embodiment.

FIG. 11 is a diagram schematically showing an overall configuration of a point-of-gaze display system 100 according to an embodiment. The point-of-gaze display system 100 according to the embodiment includes a headset 200, a video analysis device 300, a video presenter 500, and a second light source 400 attached to the video presenter 500.

The headset 200 is so configured that it can be mounted on a head of a user and used. It includes an imaging element 210 that performs imaging for video having the eyeball of either one of the right eye or left eye of the user and a first light source 220 that irradiates the eyeball imaged by the imaging element 210 with infrared light. The first light source 220 corresponds to the infrared light source mounted on the head in the above-described premise technique [II] and the imaging element 210 corresponds to the standard USB 2.0 camera from which an infrared blocking sheet is removed. Because the headset 200 is mounted on the head of the user, the imaging element 210 and the first light source 220 both move in association with the motion of the head of the user.

The eye irradiated with infrared light by the first light source 220 is irradiated with infrared light also from the second light source 400 whose relative position is invariable with respect to the video presenter 500 as the observation target for the user. The video presenter 500 corresponds to the screen in the above-described premise technique [II] and is implemented by e.g. a liquid crystal monitor or the like. The second light source 400 corresponds to the above-described light source over the screen and is so configured as to irradiate comparatively intense light by arranging three light sources on two columns. The imaging element 210 takes a follow shot of an area having reflected light of each of the first light source 220 and the second light source 400 reflected on the eyeball of the user. One example of the video obtained by the imaging by the imaging element 210 is shown in FIG. 1.

The video analysis device 300 includes a video acquirer 310, a head movement estimator 320, an eyeball movement estimator 330, a gaze position acquirer 340, and a cursor generator 350.

The video acquirer 310 acquires the video of the area having reflected light of each of the first light source 220 and the second light source 400 reflected on the eyeball of the user, obtained by imaging by the imaging element 210. The head movement estimator 320 estimates the motion of the head of the user based on the relative position of the reflected light of the second light source 400 with respect to the reflected light of the first light source 220 in the video acquired by the video acquirer 310.

Here, the position of the reflected light of the first light source 220 reflected on the eyeball of the user is $P_{cor\_hm}$ in the above-described premise technique and the position of the reflected light of the second light source 400 reflected on the eyeball of the user is above-described $P_{cor\_scr}$. The position $P_{cor\_hm}$ of the reflected light of the first light source 220 in the video can be represented by position coordinates in the video obtained by imaging by the imaging element 210. As described in premise technique [IV], the video obtained by imaging by the imaging element 210 has the VGA size and has a resolution of 640 pixels*480 pixels. Therefore, for example when the reflected light of the first light source 220 exists at the center of the video, its position coordinates are (320, 240). The head movement estimator 320 obtains the estimated amount of motion of the head of the user from direction and size of a position vector whose starting point is the position coordinates of the reflected light of the first light source 220 and whose end point is the reflected light of the second light source 400.

The eyeball movement estimator 330 estimates the motion of the eyeball imaged by the imaging element 210 based on the absolute position $P_{cor\_hm}$ of the reflected light of the first light source 220 in the video obtained by imaging by the imaging element 210. The gaze position acquirer 340 acquires an estimated value of the gaze position $P_{gaze}$ of the user in a display area of the video presenter 500 based on the motion of the head of the user estimated by the head movement estimator 320 and the motion of the eyeball estimated by the eyeball movement estimator 330.

Figure 12:
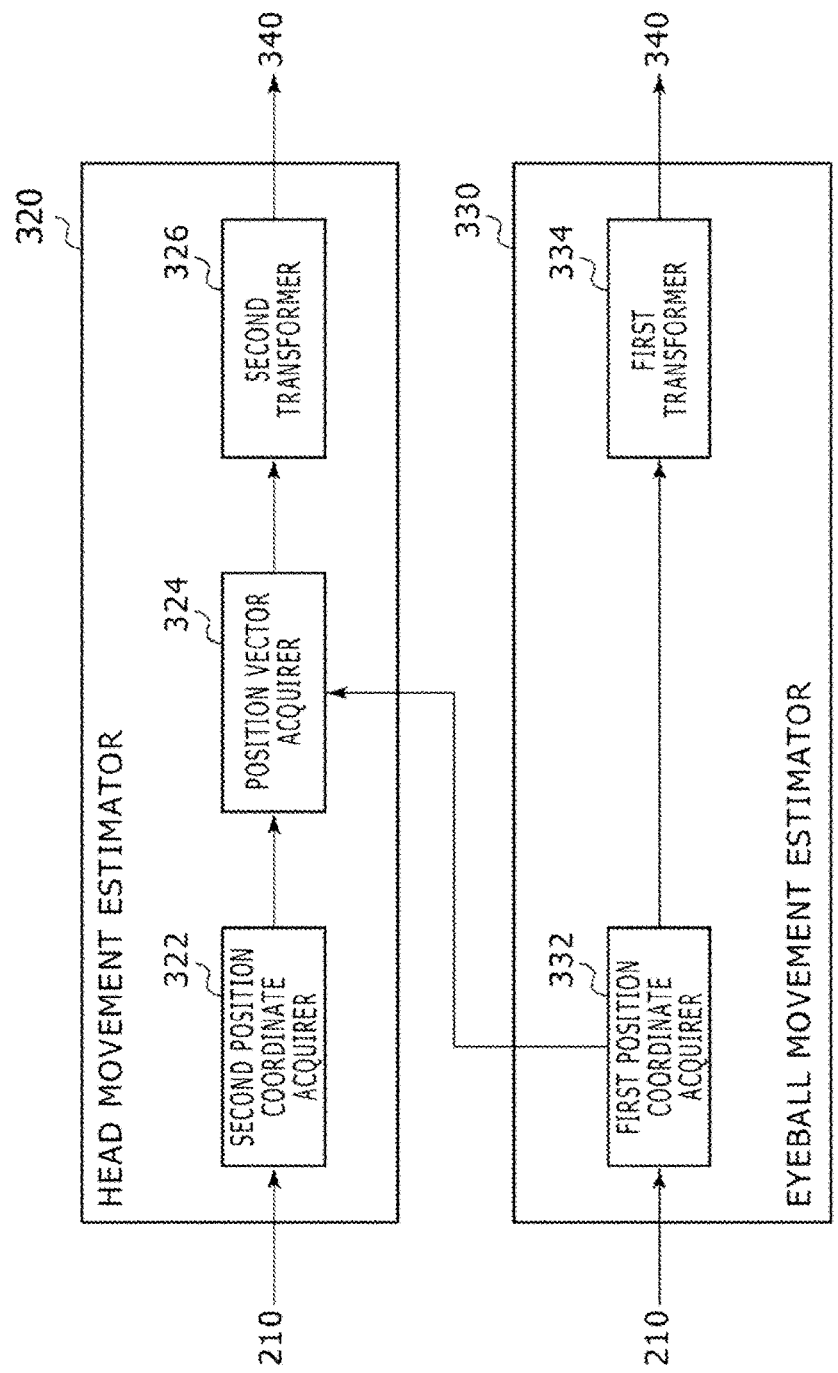
FIG. 12 is a diagram schematically showing internal configurations of a head movement estimator and an eyeball movement estimator according to the embodiment.

FIG. 12 is a diagram schematically showing internal configurations of the head movement estimator 320 and the eyeball movement estimator 330 according to the embodiment. The eyeball movement estimator 330 has a first position coordinate acquirer 332 and a first transformer 334. Furthermore, the head movement estimator 320 has a second position coordinate acquirer 322, a position vector acquirer 324, and a second transformer 326.

The first position coordinate acquirer 332 in the eyeball movement estimator 330 acquires the position coordinates $P_{cor\_hm}$ of the reflected light of the first light source 220 in the video obtained by imaging by the imaging element 210. The first transformer 334 multiples the position coordinates $P_{cor\_hm}$ of the reflected light of the first light source 220 acquired by the first position coordinate acquirer 332 by a first transformation matrix $M_{hm}$ to transform them into position coordinates in the display area of the video presenter 500 as the observation target for the user. This is based on the above-described expression (3).

The second position coordinate acquirer 322 in the head movement estimator 320 acquires the position coordinates $P_{cor\_scr}$ of the reflected light of the second light source 400 in the video obtained by imaging by the imaging element 210. The position vector acquirer 324 acquires a position vector $V_{hm\_scr}(=P_{cor\_scr}-P_{cor\_hm})$ whose starting point is the position coordinates $P_{cor\_hm}$ of the reflected light of the first light source 220 acquired by the first position coordinate acquirer 332 and whose end point is the position coordinates $P_{cor\_scr}$ of the reflected light of the second light source 400 acquired by the second position coordinate acquirer 322. By using a second transformation matrix $M_{scr\_hm}$, the second transformer 326 transforms the position vector $V_{hm\_scr}$ acquired by the position vector acquirer 324 into position coordinates in the display area of the video presenter 500 as the observation target for the user. This is based on the above-described expression (6).

A specific explanation will be made below about the principle of estimation of the motion of the eyeball of the user by the eyeball movement estimator 330 and estimation of the motion of the head of the user by the head movement estimator 320 with reference to FIG. 13.

FIG. 13 is a diagram to exemplify the positional relationship between the position coordinates $P_{cor\_hm}$ of the reflected light of the first light source 220 and the position coordinates $P_{cor\_scr}$ of the reflected light of the second light source 400. In FIGS. 13(*a*) to (*d*), sign 602 denotes the position $P_{cor\_hm}$ of the reflected light of the first light source 220 and sign 604 denotes the position $P_{cor\_scr}$ of the reflected light of the second light source 400. Furthermore, sign 606 denotes the position $C_{pup}$ of the center of a pupil.

FIG. 13(*a*) is a diagram schematically showing one example of video obtained by imaging by the imaging element 210 when the head of the user faces a front and the eyeball of the user exists near the center of the eye. On the other hand, FIG. 13(*b*) is a diagram schematically showing one example of the video obtained by imaging by the imaging element 210 when the head of the user is moved with the eyeball of the user kept located near the center of the eye.

As described above, the imaging element 210 and the first light source 220 are both set on the headset 200 and they move in association with the motion of the head of the user. For this reason, when the user moves the head without changing the position of the eyeball, a relative positional relationship among the imaging element 210, the first light source 220, and the eyeball of the user does not change. Therefore, as shown in FIGS. 13(*a*) and 13(*b*), even when the user moves the head, the position coordinates of the position $P_{cor\_hm}$ of the reflected light of the first light source 220 in the video obtained by imaging by the imaging element 210 hardly change unless the position of the eyeball is changed. In other words, the position coordinates of the position $P_{cor\_hm}$ of the reflected light of the first light source 220 in the video obtained by imaging by the imaging element 210 are determined by the position of the eyeball irrespective of the motion of the head of the user.

In contrast, the second light source 400 is not connected to the head of the user. Therefore, when the user moves the head, a positional relationship between the second light source 400 and the eyeball of the user changes even when the user does not change the position of the eyeball. Accordingly, as shown in FIGS. 13(*a*) and 13(*b*), even when the user does not change the position of the eyeball, the position coordinates of the position $P_{cor\_scr}$ of the reflected light of the second light source 400 in the video obtained by imaging by the imaging element 210 change through moving the head.

FIG. 13(*c*) is a diagram schematically showing one example of the video obtained by imaging by the imaging element 210 when the eyeball is moved from near the center of the eye to an end with the head of the user kept facing the front. The imaging element 210 and the first light source 220 move in association with the motion of the head of the user but do not move in association with the motion of the head of the user. Therefore, as shown in FIGS. 13(*a*) and 13(*c*), even when the user does not move the head, the position $P_{cor\_hm}$ of the reflected light of the first light source 220 in the video obtained by imaging by the imaging element 210 and the position coordinates of the position $P_{cor\_scr}$ of the reflected light of the second light source 400 change through moving the eyeball. On the other hand, the relative positional relationship between the position $P_{cor\_hm}$ of the reflected light of the first light source 220 and the position $P_{cor\_scr}$ of the reflected light of the second light source 400 hardly changes due to a reason that the eyeball of the human has an almost spherical shape and so forth. In other words, the relative positional relationship between the position $P_{cor\_hm}$ of the reflected light of the first light source 220 and the position $P_{cor\_scr}$ of the reflected light of the second light source 400 is determined by the position of the head irrespective of the motion of the eyeball of the user.

In the embodiment of the present invention, the point $P_{gaze}$ of gaze of the user is estimated by utilizing a first fact that the position coordinates of the position $P_{cor\_hm}$ of the reflected light of the first light source 220 in the video obtained by imaging by the imaging element 210 are determined by the position of the eyeball irrespective of the motion of the head of the user and a second fact that the relative positional relationship between the position $P_{cor\_hm}$ of the reflected light of the first light source 220 and the position $P_{cor\_scr}$ of the reflected light of the second light source 400 is determined by the position of the head irrespective of the motion of the eyeball of the user. Method A-2 in the above-described premise technique is a method utilizing the first fact and method C is a method utilizing the second fact.

FIG. 13(d) is a diagram schematically showing one example of the video obtained by imaging by the imaging element 210 when the user moves the head to the position shown in FIG. 13(b) and moves the eyeball to the position shown in FIG. 13(c). The above-described first fact and second fact are events independent of each other. Therefore, as shown in FIG. 13(d), the position of the position $P_{cor\_hm}$ of the reflected light of the first light source 220 is almost the same as the position shown in FIG. 13(b) and the relative positional relationship between the position $P_{cor\_hm}$ of the reflected light of the first light source 220 and the position $P_{cor\_scr}$ of the reflected light of the second light source 400 is almost the same as the position shown in FIG. 13(c).

From the above, the motion of the head of the user and the motion of the eyeball can be independently estimated through estimation of the motion of the eyeball of the user by the eyeball movement estimator 330 from the position coordinates of the position $P_{cor\_hm}$ of the reflected light of the first light source 220 and estimation of the motion of the head of the user by the head movement estimator 320 from the relative positional relationship between the position $P_{cor\_hm}$ of the reflected light of the first light source 220 and the position $P_{cor\_scr}$ of the reflected light of the second light source 400. Furthermore, it is also possible to estimate the direction of the line of sight of the user by synthesizing the motion of the head of the user and the motion of the eyeball.

Here, the first transformation matrix $M_{hm}$ used by the first transformer 334 is a matrix with a size of two rows and two columns calculated in advance based on the position $P_{cor\_hm}$ of the reflected light of the first light source 220 and absolute position coordinates of the gaze position $P_{gaze}$ in the display area of the video presenter 500 when the user moves the gaze position $P_{gaze}$ in the display area by moving the eyeball with the motion of the head fixed.

Specifically, position coordinates of the position $P_{cor\_hm}$ of the reflected light of the first light source 220 in the video obtained by imaging by the imaging element 210 are defined as $(x_1, y_1)$ and position coordinates of the gaze position $P_{gaze}$ at this time in the display area of the video presenter 500 are defined as $(X_1, Y_1)$. When the user fixes the motion of the head, the position coordinates $(X_1, Y_1)$ of the gaze position $P_{gaze}$ in the display area are determined depending on the position $P_{cor\_hm}$ of the reflected light of the first light source 220. Therefore, Kim satisfying $(X_1, Y_1)^T = M_{hm} \cdot (x_1, y_1)^T$ is fixed. That is, the matrix $M_{hm}$ is a matrix for mapping position coordinates in the video obtained by imaging by the imaging element 210 onto position coordinates in the display area of the video presenter 500. $M_{hm}$ can be obtained by the calibration process of method A-2 of the above-described premise technique. Symbol "T" represents transposition of a vector.

The second transformation matrix $M_{scr\_hm}$ used by the second transformer 326 is a matrix calculated in advance based on the position vector $V_{hm\_scr}$ $(=P_{cor\_scr} - P_{cor\_hm})$ acquired by the position vector acquirer 324 and the absolute position coordinates of the gaze position $P_{gaze}$ in the display area of the video presenter 500 when the user moves the gaze position $P_{gaze}$ in the display area by moving the head with the motion of the eyeball fixed.

The specific calculation measure of the second transformation matrix $M_{scr\_hm}$ is similar to the calculation measure of the first transformation matrix $M_{hm}$. Specifically, the position coordinates of the position $P_{cor\_hm}$ of the reflected light of the first light source 220 in the video obtained by imaging by the imaging element 210 are defined as $(x_1, y_1)$. The position coordinates of the position coordinates $P_{cor\_scr}$ of the reflected light of the second light source 400 are defined as $(x_2, y_2)$. The position coordinates of the gaze position $P_{gaze}$ at this time in the display area of the video presenter 500 are defined as $(X_2, Y_2)$. When the user fixes the motion of the eyeball, the position coordinates $(X_2, Y_2)$ of the gaze position $P_{gaze}$ in the display area are determined depending on the relative positional relationship of the position $P_{cor\_scr}$ of the reflected light of the second light source 400 with respect to the position $P_{cor\_hm}$ of the reflected light of the first light source 220. Therefore, $M_{scr\_hm}$ satisfying $(X_2, Y_2)^T = M_{scr\_hm} \cdot (x_2 - x_1, y_2 - y_1)^T$ is fixed. That is, the matrix $M_{scr\_hm}$ is also a matrix for mapping position coordinates in the video obtained by imaging by the imaging element 210 onto position coordinates in the display area of the video presenter 500. The matrix $M_{scr\_hm}$ can be obtained by the calibration process of method C of the above-described premise technique.

Referring back to the description of FIG. 11, the gaze position acquirer 340 in the video analysis device 300 adds the position coordinates $(X_1, Y_1)$ acquired by the first transformer 334 through the transformation and the position coordinates $(X_2, Y_2)$ acquired by the second transformer through the transformation to settle the position coordinates of the gaze position $P_{gaze}$ of the user in the display area of the video presenter 500. Specifically, the gaze position acquirer 340 calculates $M_{hm} \cdot P_{cor\_hm} + M_{scr\_hm} \cdot (P_{cor\_scr} - P_{cor\_hm})$ based on the above-described expression (7) to acquire the position coordinates of the gaze position $P_{gaze}$. The cursor generator 350 controls the position of the cursor displayed on the video presenter 500 based on the gaze position $P_{gaze}$ of the user in the display area, acquired by the gaze position acquirer 340.

FIG. 14 is a flowchart showing the flow of the point-of-gaze display processing in the point-of-gaze display system 100 according to the embodiment. The processing in the present flowchart is started when the video analysis device 300 is powered on for example.

The imaging element 210 set on the headset 200 images an eye of the user who wears the headset 200, including reflected light of the first light source 220 and the second light source 400 (S2). The first position coordinate acquirer 332 acquires the position coordinates $P_{cor\_hm}$ of the reflected light of the first light source 220 (S4). The first transformer 334 acquires position coordinates in the display area attributed to the position coordinates $P_{cor\_hm}$ of the reflected light of the first light source 220, acquired by the first position coordinate acquirer 332 by using the first transformation matrix $M_{hm}$ (S6).

The second position coordinate acquirer 322 acquires the position coordinates $P_{cor\_scr}$ of the reflected light of the second light source 400 (S8). The position vector acquirer 324 acquires the position vector $V_{hm\_scr}$ whose starting point is the position coordinates $P_{cor\_hm}$ of the reflected light of the first light source 220, acquired by the first position coordinate acquirer 332, and whose end point is the position coordinates $P_{cor\_scr}$ of the reflected light of the second light source 400, acquired by the second position coordinate acquirer 322 (S10).

The second transformer 326 transforms the position vector $V_{hm\_scr}$ acquired by the position vector acquirer 324 by using the second transformation matrix $M_{scr\_hm}$ to acquire position coordinates attributed to the movement of the head of the user (S12). The gaze position acquirer 340 adds the position coordinates acquired by the first transformer 334 and the position coordinates acquired by the second transformer 326 to calculate the position of the point $P_{gaze}$ of gaze of the user in the display area of the video presenter 500 (S14). The cursor generator 350 moves the position of the cursor displayed on the video presenter 500 based on the gaze position $P_{gaze}$ of the user in the display area, acquired by the gaze position acquirer 340 (S16). When the cursor generator 350 has moved the position of the cursor displayed on the video presenter 500, the processing in the present flowchart ends.

A use scene of the point-of-gaze display system 100 based on the above configuration is as follows. A user wears the headset 200 according to the embodiment and views the display area of the video presenter 500. The imaging element 210 set on the headset 200 images an area including an eyeball of the user. The video analysis device 300 estimates the position of the point of gaze of the user in the display area of the video presenter 500 from the positional relationship between two reflect light beams of infrared light irradiated from the first light source 220, which moves in association with the motion of the head of the user, and infrared light irradiated from the second light source 400 attached to the video presenter 500, and moves a cursor to this position.

As described above, according to the point-of-gaze display system 100 in accordance with the embodiment, a technique that enables control of the point of gaze without taking calculation cost can be provided.

In particular, according to the point-of-gaze display system 100 in accordance with the embodiment of the present invention, the position of the center of a pupil of the user is not used for estimation of the point of gaze of the user and therefore calculation to obtain the center position of the pupil can be omitted. Furthermore, the motion of the head of the user and the motion of the eyeball can be separately estimated and thus information on them can be independently used. This can realize e.g. operation of moving a cursor by the motion of the line of sight while panning a background image in association with the motion of the head. Moreover, it is also possible to realize specific processing when the motion and position of the head and the motion and position of the eyeball enter into a specific relationship. Specifically, it is possible to realize e.g. processing of, when the head and the eyeball move in the same direction, scrolling the screen in this direction.

The present invention is described above based on the embodiment. It will be understood by those skilled in the art that the embodiment is exemplification and various modification examples are possible in combinations of the respective constituent elements and the respective processing processes thereof and such modification examples are also within the scope of the present invention.

(First Modification Example)

In the above description, explanation is made based on the premise that the second light source 400 is attached to the video presenter 500. However, the second light source 400 does not necessarily need to be set near the video presenter 500. It is enough for the second light source 400 to be set at such a position that it can irradiate an eyeball of a user with infrared light independently of the motion of the head of the user. On the other hand, the video presenter 500 is the observation target of the user. Therefore, it is more preferable that a distance between the second light source 400 and the video presenter 500 is shorter because it becomes easier to irradiate an eye of the user with irradiated light of the second light source 400.

(Second Modification Example)

If calculation cost for obtaining the center $C_{pup}$ of a pupil is permitted, the point $P_{gaze}$ of gaze may be estimated by combining method B-2 and method C in the above-described premise technique. In this case, mapping transformation can be represented by the following expression (8).

$$P_{gaze}=M_{hm\_pup}\cdot(P_{cor\_hm}-C_{pup})+M_{scr\_hm}\cdot(P_{cor\_scr}-P_{cor\_hm}) \quad (8)$$

This can realize point-of-gaze control having combined two characteristics, the characteristics of method B-2 and the characteristics of method C.

(Third Modification Example)

It is also possible to further generalize the above-described methods and come down to an issue of estimating the point $P_{gaze}$ of gaze from the position $P_{cor\_hm}$ of the reflected light of the first light source 220, the position $P_{cor\_scr}$ of the reflected light of the second light source 400, and the center $C_{pup}$ of a pupil. In this case, mapping transformation can be represented by the following expression (9).

$$P_{gaze}=M_1\cdot P_{cor\_hm}+M_2\cdot P_{cor\_scr}+M_3\cdot C_{pup} \quad (9)$$

Here, $M_1$, $M_2$, and $M_3$ are each a generalized transformation matrix. There is also a case in which any one or two of $M_1$, $M_2$, and $M_3$ are a zero matrix.

This can realize e.g. the following flexible point-of-gaze estimation. Specifically, $C_{pup}$ is utilized for the point-of-gaze estimation when there is an allowance in the calculation resources, whereas the point of gaze is estimated without using $C_{pup}$ when reduction in the calculation cost is desired.

REFERENCE SIGNS LIST

100 Point-of-gaze display system, 200 Headset, 210 Imaging element, 220 First light source, 300 Video analysis device, 310 Video acquirer, 320 Head movement estimator, 322 Second position coordinate acquirer, 324 Position vector acquirer, 326 Second transformer, 330 Eyeball movement estimator, 332 First position coordinate acquirer, 334 First transformer, 340 Gaze position acquirer, 350 Cursor generator, 400 Second light source, 500 Video presenter.

INDUSTRIAL APPLICABILITY

The present invention can be utilized for a video analysis device, a video analysis method, and a point-of-gaze display system.

The invention claimed is:

1. A video analysis device, comprising:
a video acquirer that acquires video obtained by imaging, by an imaging element that moves in association with motion of a head of a user, an area having reflected light from each of two respective light beams irradiated onto at least one eyeball of the user from a first light source that moves in association with the motion of the head of the user and a second light source whose relative position is invariable with respect to a video presenter as an observation target for the user,
a head movement estimator that estimates the motion of the head of the user based on a relative position of the reflected light of the second light source with respect to the reflected light of the first light source in the video acquired by the video acquirer,
an eyeball movement estimator that estimates motion of the eyeball imaged by the imaging element based on an absolute position of the reflected light of the first light source in the video obtained by imaging by the imaging element, and
a gaze position acquirer that acquires a gaze position of the user based on the motion of the head of the user and the motion of the eyeball that are estimated, wherein:
the eyeball movement estimator has: (i) a first position coordinate acquirer that acquires position coordinates of the reflected light of the first light source in the video obtained by imaging by the imaging element, and (ii) a first transformer that multiplies the position coordinates acquired by the first position coordinate acquirer by a predetermined first transformation matrix to transform the position coordinates into position coordinates in a display area of the video presenter as the observation target for the user,
the first transformation matrix used by the first transformer is a matrix calculated in advance based on position coordinates of the reflected light of the first light source and absolute position coordinates of a gaze position in the display area of the video presenter when the user moves the gaze position in the display area by moving the eyeball with the motion of the head fixed,
the head movement estimator has: (i) a second position coordinate acquirer that acquires position coordinates of the reflected light of the second light source in the video obtained by imaging by the imaging element, (ii) a position vector acquirer that acquires a position vector whose starting point is the position coordinates acquired by the first position coordinate acquirer and whose end point is the position coordinates acquired by the second position coordinate acquirer, and (iii) a second transformer that transforms the position vector acquired by the position vector acquirer into position coordinates in the display area of the video presenter as the observation target for the user, and
the second transformer transforms the position vector into the position coordinates in the display area of the video presenter by using a second transformation matrix calculated in advance based on a position vector acquired by the position vector acquirer and absolute position coordinates of a gaze position in the display area of the video presenter when the user moves the gaze position in the display area by moving the head with the motion of the eyeball fixed.

2. The video analysis device according to claim 1, wherein the gaze position acquirer adds the position coordinates resulting from transformation by the first transformer and the position coordinates resulting from transformation by the second transformer to acquire the gaze position of the user.

3. The video analysis device according to claim 1, wherein the second light source is attached to the video presenter as the observation target for the user.

4. A video analysis method, comprising:
causing a processor to execute acquiring video obtained by imaging, by an imaging element that moves in association with motion of a head of a user, an area having reflected light from each of two respective light beams irradiated onto at least one eyeball of the user from a first light source that moves in association with the motion of the head of the user and a second light source whose relative position is invariable with respect to a video presenter as an observation target for the user,
estimating the motion of the head of the user based on a relative position of the two reflected light beams in the video,
estimating motion of the eyeball imaged by the imaging element based on an absolute position of the reflected light of the first light source in the video obtained by imaging by the imaging element, and
acquiring a gaze position of the user based on the motion of the head of the user and the motion of the eyeball that are estimated, wherein:
the estimating motion of the eyeball includes: (i) acquiring position coordinates of the reflected light of the first light source in the video obtained by imaging by the imaging element, and (ii) multiplying the position coordinates by a predetermined first transformation matrix to transform the position coordinates into position coordinates in a display area of the video presenter as the observation target for the user,
the first transformation matrix is a matrix calculated in advance based on position coordinates of the reflected light of the first light source and absolute position coordinates of a gaze position in the display area of the video presenter when the user moves the gaze position in the display area by moving the eyeball with the motion of the head fixed,
the estimating the motion of the head includes: (i) acquiring position coordinates of the reflected light of the second light source in the video obtained by imaging by the imaging element, (ii) acquiring a position vector whose starting point is the position coordinates of the reflected light of the first light source and whose end point is the position coordinates of the reflected light of the second light source, and (iii) transforming the position vector into position coordinates in the display area of the video presenter as the observation target for the user, and
the transforming the position vector transforms the position vector into the position coordinates in the display area of the video presenter by using a second transformation matrix calculated in advance based on a position vector acquired and absolute position coordinates of a gaze position in the display area of the video presenter when the user moves the gaze position in the display area by moving the head with the motion of the eyeball fixed.

5. A non-transitory, computer readable storage medium comprising a program, which when executed by a computer, causes the computer to carry out actions, comprising:
acquiring video obtained by imaging, by an imaging element that moves in association with motion of a head of a user, an area having reflected light from each of two respective light beams irradiated onto at least one eyeball of the user from a first light source that moves in association with the motion of the head of the user and a second light source whose relative position is invariable with respect to a video presenter as an observation target for the user, estimating the motion of the head of the user based on a relative position of the two reflected light beams in the video, estimating motion of the eyeball imaged by the imaging element based on an absolute position of the reflected light of the first light source in the video obtained by imaging by the imaging element, and acquiring a gaze position of the user based on the motion of the head of the user and the motion of the eyeball that are estimated, wherein:

the estimating motion of the eyeball includes: (i) acquiring position coordinates of the reflected light of the first light source in the video obtained by imaging by the imaging element, and (ii) multiplying the position coordinates by a predetermined first transformation matrix to transform the position coordinates into position coordinates in a display area of the video presenter as the observation target for the user, the first transformation matrix is a matrix calculated in advance based on position coordinates of the reflected light of the first light source and absolute position coordinates of a gaze position in the display area of the video presenter when the user moves the gaze position in the display area by moving the eyeball with the motion of the head fixed, the estimating the motion of the head includes: (i) acquiring position coordinates of the reflected light of the second light source in the video obtained by imaging by the imaging element, (ii) acquiring a position vector whose starting point is the position coordinates of the reflected light of the first light source and whose end point is the position coordinates of the reflected light of the second light source, and (iii) transforming the position vector into position coordinates in the display area of the video presenter as the observation target for the user, and the transforming the position vector transforms the position vector into the position coordinates in the display area of the video presenter by using a second transformation matrix calculated in advance based on a position vector acquired and absolute position coordinates of a gaze position in the display area of the video presenter when the user moves the gaze position in the display area by moving the head with the motion of the eyeball fixed.

6. A point-of-gaze display system, comprising:
a head-mounted imaging element that is an imaging element to image at least one eyeball of a user and moves in association with motion of a head of the user,
a first light source that is a light source to irradiate the at least one eyeball imaged by the imaging element with light and moves in association with motion of the imaging element,
a video presenter as an observation target for the user,
a second light source that is a light source to irradiate the at least one eyeball imaged by the imaging element with light and is attached to the video presenter, such that the imaging element images an area having reflected light from each of two respective light beams irradiated onto the at least one eyeball of the user from the first light source and the second light source, respectively, a head movement estimator that estimates motion of the head of the user based on a relative position of reflected light of the second light source with respect to reflected light of the first light source in video obtained by imaging by the imaging element, an eyeball movement estimator that estimates motion of the eyeball imaged by the imaging element based on an absolute position of the reflected light of the first light source in the video obtained by imaging by the imaging element, a gaze position acquirer that acquires a gaze position of the user based on the motion of the head of the user and the motion of the eyeball that are estimated, and a cursor generator that generates a cursor image displayed at a position in a display area of the video presenter corresponding to the gaze position acquired by the gaze position acquirer, wherein:

the eyeball movement estimator has: (i) a first position coordinate acquirer that acquires position coordinates of the reflected light of the first light source in the video obtained by imaging by the imaging element, and (ii) a first transformer that multiplies the position coordinates acquired by the first position coordinate acquirer by a predetermined first transformation matrix to transform the position coordinates into position coordinates in a display area of the video presenter as the observation target for the user, the first transformation matrix used by the first transformer is a matrix calculated in advance based on position coordinates of the reflected light of the first light source and absolute position coordinates of a gaze position in the display area of the video presenter when the user moves the gaze position in the display area by moving the eyeball with the motion of the head fixed, the head movement estimator has: (i) a second position coordinate acquirer that acquires position coordinates of the reflected light of the second light source in the video obtained by imaging by the imaging element, (ii) a position vector acquirer that acquires a position vector whose starting point is the position coordinates acquired by the first position coordinate acquirer and whose end point is the position coordinates acquired by the second position coordinate acquirer, and (iii) a second transformer that transforms the position vector acquired by the position vector acquirer into position coordinates in the display area of the video presenter as the observation target for the user, and the second transformer transforms the position vector into the position coordinates in the display area of the video presenter by using a second transformation matrix calculated in advance based on a position vector acquired by the position vector acquirer and absolute position coordinates of a gaze position in the display area of the video presenter when the user moves the gaze position in the display area by moving the head with the motion of the eyeball fixed.

* * * * *